United States Patent
Sundaresan

(10) Patent No.: US 9,333,963 B2
(45) Date of Patent: May 10, 2016

(54) VACUUM PUMP FOR A BRAKE SYSTEM WITH CLUTCH ATTACHMENT TO AN ENGINE

(71) Applicant: Continental Automotive Systems, Inc., Auburn Hills, MI (US)

(72) Inventor: Srini Sundaresan, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 653 days.

(21) Appl. No.: 13/713,469

(22) Filed: Dec. 13, 2012

(65) Prior Publication Data

US 2014/0171264 A1    Jun. 19, 2014

(51) Int. Cl.
| | |
|---|---|
| *B60W 10/02* | (2006.01) |
| *B60T 17/02* | (2006.01) |
| *B60T 13/46* | (2006.01) |
| *F04B 49/06* | (2006.01) |

(52) U.S. Cl.
CPC ............... *B60W 10/02* (2013.01); *B60T 13/46* (2013.01); *B60T 17/02* (2013.01); *F04B 49/06* (2013.01); *Y10T 477/70* (2015.01)

(58) Field of Classification Search
CPC .............................. B60W 10/02; Y10T 477/77
See application file for complete search history.

(56) References Cited

U.S. PATENT DOCUMENTS

| | | | |
|---|---|---|---|
| 8,231,182 B2 | 7/2012 | Schonlau et al. | |
| 2003/0094317 A1* | 5/2003 | Takizawa et al. | 180/53.8 |
| 2010/0230187 A1* | 9/2010 | Kraft | B60K 6/26 |
| | | | 180/53.8 |
| 2012/0141299 A1* | 6/2012 | Bang et al. | 417/22 |

FOREIGN PATENT DOCUMENTS

| | | |
|---|---|---|
| DE | 102006046478 A1 | 1/2008 |
| EP | 1314884 A2 | 5/2003 |
| EP | 0553010 A1 | 7/2003 |
| FR | 2916177 A1 | 11/2008 |
| WO | WO 2014029444 A1 | 2/2014 |

OTHER PUBLICATIONS

International Search Report and the Written Opinion of the International Searching Authority, PCT/US2013/074317, dated May 23, 2014.

* cited by examiner

*Primary Examiner* — Derek D Knight

(57) ABSTRACT

A brake system for a vehicle comprises a vacuum pump mounted to an engine, wherein the vacuum pump is selectively connected to be driven by the engine. A clutch is mounted within a housing for the vacuum pump. The clutch can be selectively engaged to drive the vacuum pump with the engine. A sensor is connected to the clutch such that the clutch is actuated to engage when the sensor determines that one of a vacuum within the pump is below a predetermined vacuum threshold and when the engine speed is below a predetermined speed threshold.

5 Claims, 3 Drawing Sheets

VACUUM PUMP FOR A BRAKE SYSTEM WITH CLUTCH ATTACHMENT TO AN ENGINE

TECHNICAL FIELD

The present disclosure relates to automotive vehicles, and more particularly to brake systems for automotive vehicles.

BACKGROUND

Hydraulic brake systems require vacuum pressure to efficiently operate the brakes. Vacuum pressure from a combustion engine is typically used to provide the required vacuum for the brake system. However, the vacuum pressure demand by the brake system may occur in situations when the vacuum pressure available from the engine is not sufficient, e.g. cold start or high altitude. Insufficient vacuum pressure within the brake system is particularly common in direct injected engines over those that are naturally aspirated. However, other considerations may make use of a directly injected engine desirable. Therefore, a vacuum pump is used to provide the additional vacuum pressure required by the brake system.

Vacuum pumps can be mounted to the engine and driven by the crank shaft for the engine. However, mounting of the vacuum pump to the engine results in the pump continuously running while the engine is on. This is inefficient as the vacuum pump is running even when the engine is providing sufficient vacuum.

Alternatively, vacuum pumps can be independently driven by a vacuum pump motor. The vacuum pump motor can drive the vacuum pump only when necessary to produce vacuum pressure for the brake system. However, the size of motor required to produce the necessary vacuum pressure in an efficient manner is large and adds cost and weight to the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A brake system for a vehicle comprises a vacuum pump mounted to an engine, wherein the vacuum pump is selectively connected to be driven by the engine. A clutch is mounted within a housing for the vacuum pump. The clutch can be selectively engaged to drive the vacuum pump with the engine. A sensor attached to the brake booster is connected to the clutch such that the clutch is actuated to engage when the sensor determines that one of a vacuum pressure within the booster is below a predetermined vacuum threshold and when the engine speed is below a predetermined speed threshold.

A method of operating a vacuum pump for a brake system of a vehicle comprises engaging a clutch located between the vacuum pump and an engine to drive the vacuum pump when one of a vacuum pressure is below a first vacuum threshold and the engine speed is below of first predetermined threshold.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
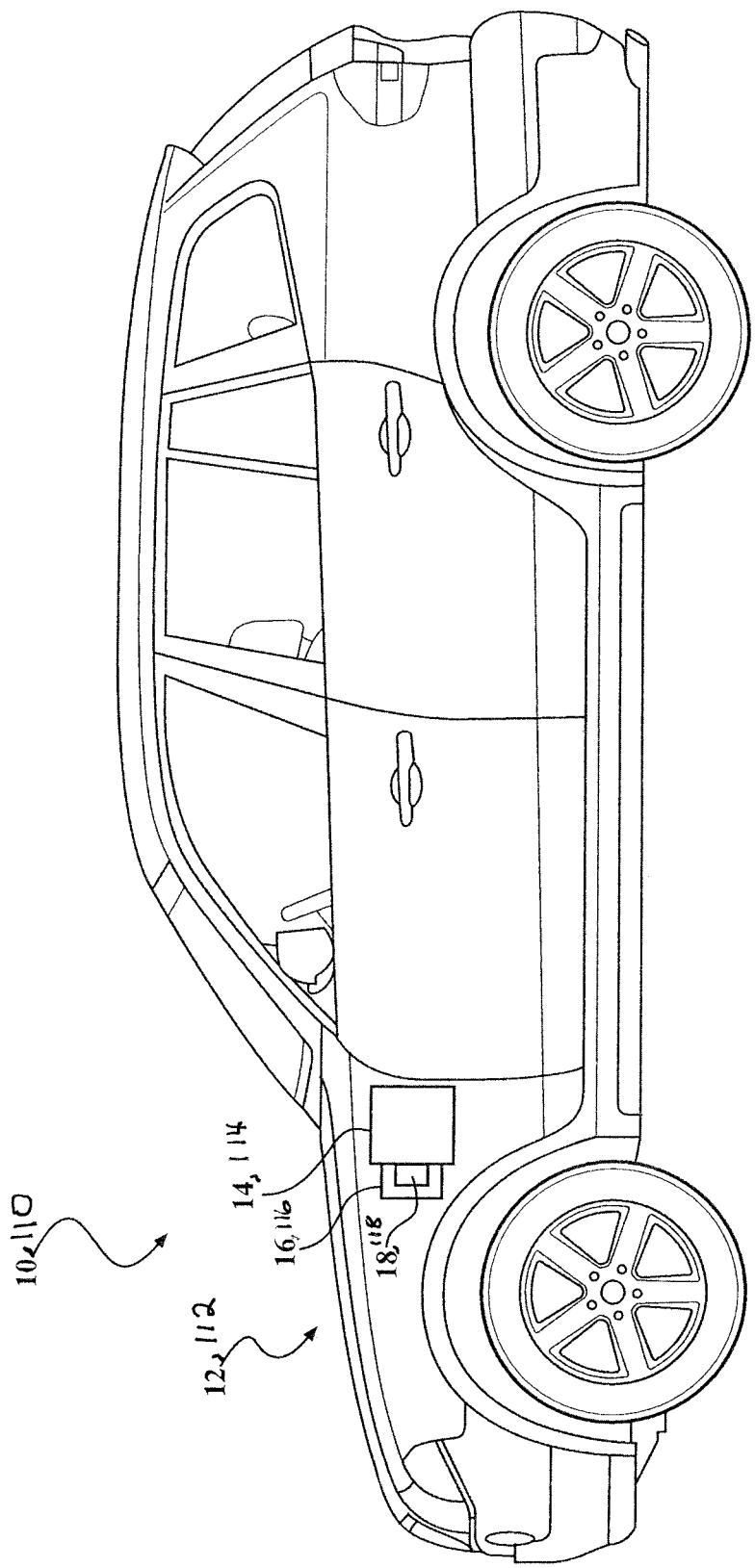
FIG. 1 is a schematic illustration of a vehicle having a brake system of the present invention utilizing a vacuum pump with clutch attachment.

The following description is merely exemplary in nature and is in no way intended to limit the disclosure, its application, or uses. For purposes of clarity, the same reference numbers will be used in the drawings to identify similar elements. FIG. 1 illustrates a vehicle 10, 110 and a brake system 12, 112 of the present invention and a combustion engine 14, 114. The brake system 12, 112 includes a vacuum pump 16, 116 which is selectively connected to the engine 14, 114 with a clutch 18, 118. The vacuum pump 16, 116 can be disconnected from the engine 14, 114 by disengaging the clutch 16, 116 or connected to the engine 14, 114 by engaging the clutch 16, 116. In this manner, the vacuum pump 16, 116 is only being driven by the engine 14, 114 when additional vacuum pressure is required by the brake system 12, 112, as described in further detail below. The clutch 16, 166 may be any type of clutch 16, 116 including but not limited to a mechanical clutch, an electrical clutch, and an electromechanical clutch, such as a wrap spring clutch with a solenoid, etc.

Figure 2:
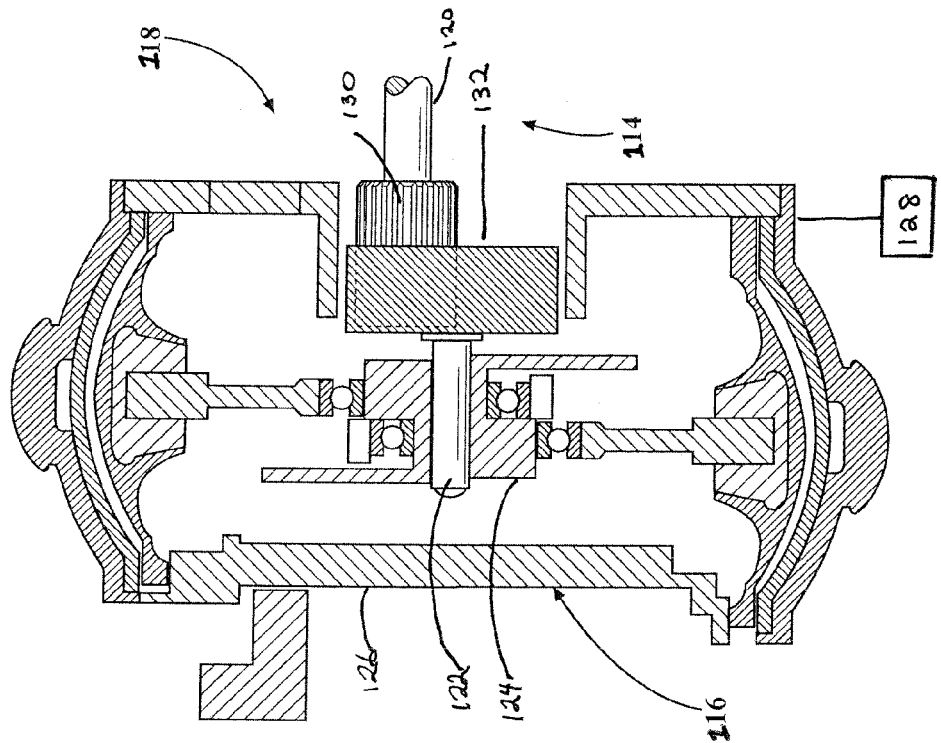
FIG. 2 is a schematic illustration of a brake system of the present invention utilizing a first embodiment of a vacuum pump with clutch attachment; for the vehicle of FIG. 1.

Referring to FIGS. 1-2 a first embodiment of the brake system 12 having a vacuum pump 16 and a clutch 18 is shown. The vacuum pump 16 illustrated is a diaphragm style vacuum pump 16. Other types of vacuum pumps 16 may also be used. The type of vacuum pump 16 that is used is based upon what provides the best design for the brake system 12 and vehicle 10. One skilled in the art would be able to determine the type of vacuum pump 16 that is preferable for a particular brake system 12 and vehicle 10.

The clutch 18 is located between the engine 14 and the vacuum pump 16. Specifically, the clutch 18 is connected to a crank shaft for 20 for the engine 14, which provides an input into the clutch 18. An output shaft 22 of the clutch 18 is engaged by gears 24 of the vacuum pump 16. When the clutch 18 is in the engaged position the crank shaft 20 is engaged with the vacuum pump gears 24 to provide drive, thereto. The clutch 18 may be assembled within a housing 26 for the vacuum pump 16 to provide easy assembly of the vacuum pump 16 and the clutch 18 onto the engine 14. When the clutch 18 is disengaged the crank shaft 20 is disconnected from the vacuum pump gears 24. The engine 14 is not driving the vacuum pump 16 and, therefore, there are not parasitic losses associated with the continuous running of the vacuum pump 16.

Figure 4:
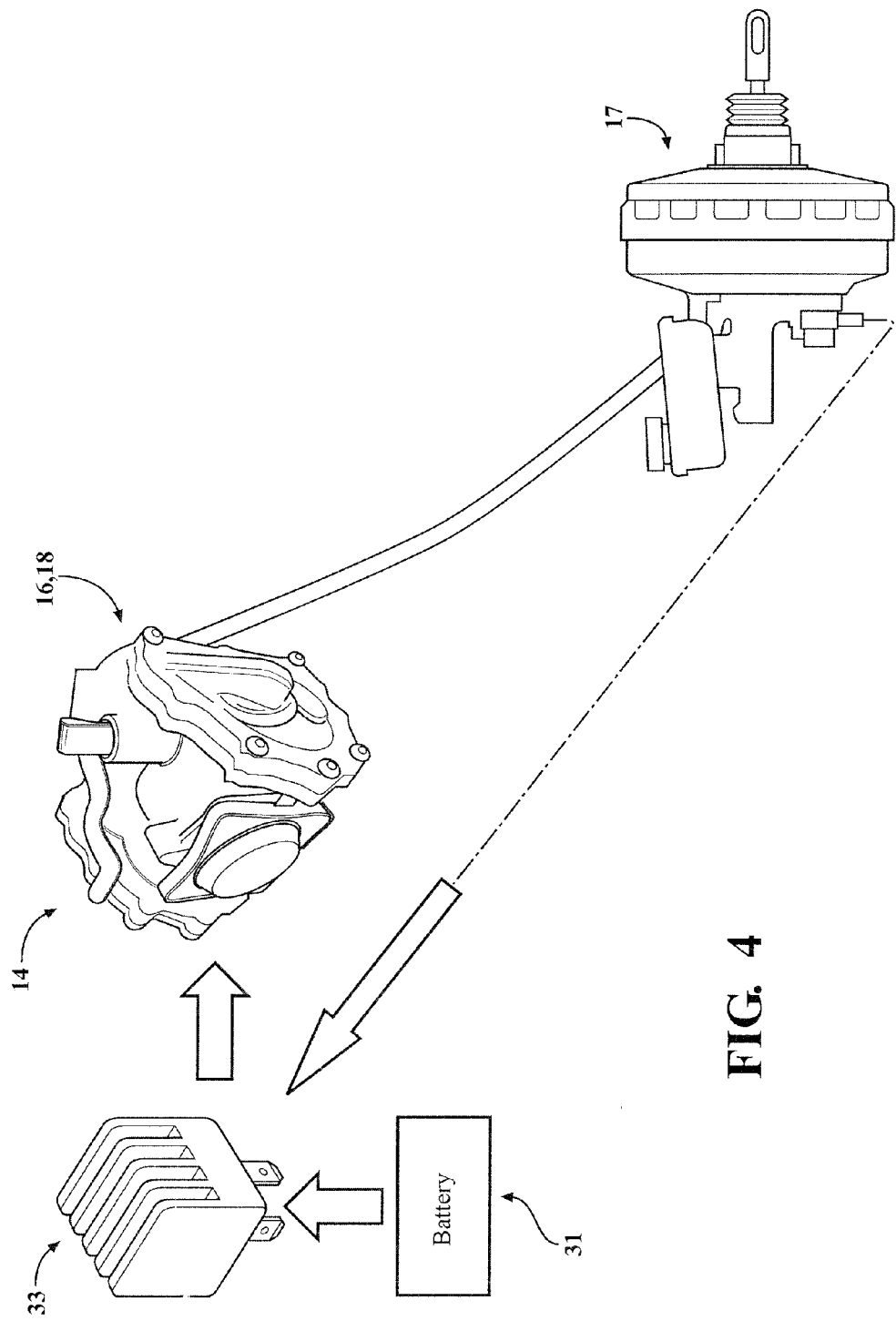
FIG. 4 is a schematic illustration of a control strategy for the brake system of the present invention utilizing the first embodiment of the vacuum pump with clutch attachment; for the vehicle of FIGS. 1-2.

Referring to FIGS. 1-2 and 4, the clutch 18 is an electromagnetic clutch. A sensor 28 located within the vacuum pump 16 may sense the pressure level of the vacuum. When the vacuum within a brake booster 17 drops below a predetermined threshold, e.g. below 600 mBar of vacuum, the vacuum pump 16 may be activated to raise the vacuum level, i.e. decrease pressure within the booster 17. The vacuum pump 16 is activated by engaging the clutch 18 to provide drive from the engine 14. The sensor 28 and an actuator 30 for the clutch 18 may be connected to the vehicle battery 31 to provide power to the sensor 26 and the actuator 30 for the clutch 18. An electronic relay 33 may be located between the battery 31 and the brake booster 17. The actuator 30 moves the clutch 18 from a disengaged to an engaged position to drive the vacuum pump 16. The actuator 30 may be an electronic relay to an electro-mechanical actuating component within the clutch 18.

Alternatively, the clutch 18 may be a mechanical clutch with an actuator 30. A sensor 28 located may sense the rotational speed of the engine crank shaft 20. When the engine crank shaft 20 is above a predetermined threshold the vacuum pump 16 may be activated to raise the vacuum level. The vacuum pump 16 is activated by engaging the clutch 18 to provide drive from the engine 14. The sensor 28 for the mechanical clutch 18 may be connected to the vehicle battery (not shown) to provide power to the sensor and the actuator 30 for the clutch 18. The actuator 30 moves the clutch 18 from a disengaged to an engaged position to drive the vacuum pump 16.

The clutch 18 may disengaged to disconnect the vacuum pump 16 from the engine 14 when either of the vacuum threshold is above a predetermined second vacuum threshold and/or when the engine speed is above a predetermined second speed threshold. Therefore the clutch 18 will only be engaged as long as necessary to bring the vacuum within the vacuum pump 16 into the desirable operating range.

To provide further efficiency, it may be desirable to provide further programming to ensure that the vacuum pump 16 is not operated when the engine 14 is at high rpm when additional vacuum is not necessary. Therefore, the sensor 28 and actuator 30 may be designed to engage the clutch 18 only when both the engine 14 is below a predetermined operating speed and the vacuum in the pump 16 is below a threshold level.

The relative size between the vacuum pump 16 and the engine 14 should make additional dampening between the components unnecessary and the vacuum pump 16 may be directly mounted to the housing for the engine 12. The control strategy utilized to operate the vacuum pump 16 may therefore be a simple on/off switch based upon pressure within vacuum pump 16 and/or engine speed.

Figure 3:
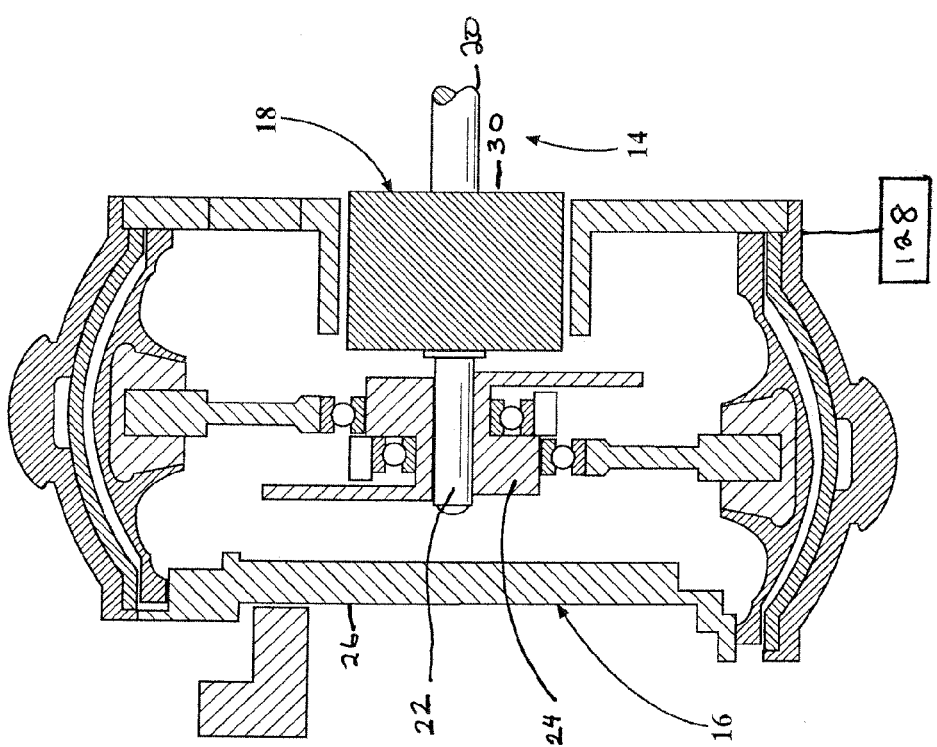
FIG. 3 is a schematic illustration of a brake system of the present invention utilizing a second embodiment of a vacuum pump with clutch attachment; for the vehicle of FIG. 1.

Referring to FIGS. 1 and 3, an alternate embodiment of a vacuum pump 116 with a clutch 118 for selectively connecting the vacuum pump 116 to an engine 114 is illustrated. The vacuum pump 116 illustrated is a diaphragm style vacuum pump 116. Other types of vacuum pumps 116 may also be used. The type of vacuum pump 116 that is used is based upon what provides the best design for the brake system 112 and vehicle 110. One skilled in the art would be able to determine the type of vacuum pump 116 that is preferable for a particular brake system 112 and vehicle 110.

The clutch 118 is located between the engine 114 and the vacuum pump 116. A gear multiplier 132 is located between the clutch 118 and the vacuum pump gears 124. Specifically, a crank shaft 120 for the engine 114 provides an input into the clutch 118 and the gear multiplier 132 is driven when the clutch 118 is engaged. The gear multiplier 132 is driven by the output of the clutch (not shown) and an output shaft 122 of the gear multiplier 132 is engaged by gears 124 of the vacuum pump 116. When the clutch 118 is in the engaged position the crank shaft 120 is engaged with the vacuum pump gears 124 to provide drive, thereto. The gear multiplier 132 allows the vacuum pump 116 to operate at a higher speed than the crank shaft 120 for the engine 114. Thus, when the engine 114 is operating at low rpm the vacuum pump 116 may still quickly and efficiently provide vacuum pressure for the brake system 112.

The clutch 118 and the gear multiplier 132 may be assembled within a housing 126 for the vacuum pump 116 to provide easy assembly of the vacuum pump 116, the clutch 118 and the gear multiplier 132 onto the engine 114. When the clutch 118 is disengaged the crank shaft 120 is disconnected from the vacuum pump gears 124. The engine 114 is not driving the vacuum pump 116 and therefore there are not parasitic losses associated with the continuous running of the vacuum pump 116.

In one embodiment, the clutch 118 is an electromagnetic clutch. A sensor 128 located within the vacuum pump 116 may sense the pressure level of the vacuum. When the vacuum within the vacuum pump 116 drops below a predetermined threshold, i.e. pressure increases and there is not sufficient vacuum, the vacuum pump 116 may be activated to raise the vacuum level, i.e. decrease pressure within the vacuum pump 116. The vacuum pump 116 is activated by engaging the clutch 118 to provide drive from the engine 114. The sensor 128 and an actuator 130 for the clutch 118 may be connected to the vehicle battery (not shown) to provide power to the sensor and the actuator 130 for the clutch 118. The actuator 130 moves the clutch 118 from a disengaged to an engaged position to drive the vacuum pump 116.

Alternatively, the clutch 118 may be a mechanical clutch with an actuator 130. A sensor 128 may sense the rotational speed of the engine crank shaft 120. When the engine crank shaft 120 is above a predetermined threshold rpm the vacuum pump 116 may be activated to raise the vacuum level. The vacuum pump 116 is activated by engaging the clutch 118 to provide drive from the engine 114. The sensor 128 for the mechanical clutch 118 may be connected to the vehicle battery (not shown) to provide power to the sensor and the actuator 130 for the clutch 118. The actuator 130 moves the clutch 118 from a disengaged to an engaged position to drive the vacuum pump 116.

The gear multiplier 132 will result in the vacuum pump 116 operating at increased speed of the engine. For example the vacuum pump 116 may operate at three times the engine rpm. As a result, it may be important to ensure that the vacuum pump 116 is not operated when the engine 114 is at high rpm, e.g. not greater than 1500 engine rpm, as the vacuum pump 116 may not be able to operate at these speeds. Therefore, the sensor 128 and actuator 130 may be determined to engage the clutch 118 only when the engine 114 is within a predetermined operating range. The gear multiplier 132 allows the vacuum pump 116 to evacuate faster providing a faster reaction time, i.e. sufficient vacuum within the pump 116 is reached more quickly.

Therefore, clutch 118 may disengaged to disconnect the vacuum pump 116 from the engine 114 when either of the vacuum threshold is above a predetermined second vacuum threshold and when the engine speed is above a predetermined second speed threshold. Therefore the clutch 118 will only be engaged as long as necessary to bring the vacuum within the vacuum pump 116 into the desirable operating range.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A brake system for a vehicle comprising:
   a vacuum pump mounted to an engine crankshaft, wherein the vacuum pump is selectively connected to be driven by the engine;
   a clutch mounted within a housing for the vacuum pump wherein the clutch can be selectively engaged to drive the vacuum pump with the engine; and
   a sensor connected to the clutch wherein the clutch is actuated to engage when the sensor determines a vacuum within the pump is below a predetermined vacuum threshold and the engine speed is below a predetermined speed threshold.

2. The brake system of claim 1, wherein the clutch is an electromagnetic clutch.

3. The brake system of claim 1, wherein the clutch is disengaged to disconnect the vacuum pump from the engine when one of the vacuum threshold is above a predetermined second vacuum threshold and when the engine speed is above a predetermined second speed threshold.

4. A method of operating a vacuum pump for a brake system of a vehicle comprising:
   engaging a clutch directly located between the vacuum pump and a combustion engine to drive the vacuum pump when a vacuum pressure is below a first vacuum threshold and the engine speed is below of a first predetermined threshold.

5. The method of claim 4, further comprising disengaging the clutch to disconnect the vacuum pump from the engine when one of the vacuum threshold is above a predetermined second vacuum threshold and when the engine speed is above a predetermined second speed threshold.

* * * * *